United States Patent
Makal et al.

(10) Patent No.: US 9,546,242 B2
(45) Date of Patent: Jan. 17, 2017

(54) THERMOPLASTIC POLYURETHANES WITH CRYSTALLINE CHAIN ENDS

(71) Applicant: Lubrizol Advanced Materials, Inc., Cleveland, OH (US)

(72) Inventors: Umit G. Makal, Stow, OH (US); Bryce W. Steinmetz, Medina, OH (US); Qiwei Lu, Seven Hills, OH (US); Roger W. Day, Solon, OH (US)

(73) Assignee: Lubrizol Advanced Materials, Inc., Cleveland, OH (US)

( * ) Notice: Subject to any disclaimer, the term of this patent is extended or adjusted under 35 U.S.C. 154(b) by 3 days.

(21) Appl. No.: 14/438,653

(22) PCT Filed: Oct. 14, 2013

(86) PCT No.: PCT/US2013/064763
§ 371 (c)(1),
(2) Date: Apr. 27, 2015

(87) PCT Pub. No.: WO2014/070426
PCT Pub. Date: May 8, 2014

(65) Prior Publication Data
US 2015/0299377 A1     Oct. 22, 2015

Related U.S. Application Data

(60) Provisional application No. 61/720,563, filed on Oct. 31, 2012.

(51) Int. Cl.
| | |
|---|---|
| *C08G 18/28* | (2006.01) |
| *C08G 18/48* | (2006.01) |
| *C08G 18/76* | (2006.01) |
| *C08G 18/83* | (2006.01) |
| *C08G 18/16* | (2006.01) |
| *C08G 18/66* | (2006.01) |
| *C08G 18/32* | (2006.01) |
| *C08G 18/42* | (2006.01) |
| *C08G 18/44* | (2006.01) |
| *C08L 23/06* | (2006.01) |
| *C08L 75/04* | (2006.01) |
| *C08L 75/08* | (2006.01) |

(52) U.S. Cl.
CPC ......... *C08G 18/2825* (2013.01); *C08G 18/168* (2013.01); *C08G 18/283* (2013.01); *C08G 18/285* (2013.01); *C08G 18/2805* (2013.01); *C08G 18/288* (2013.01); *C08G 18/289* (2013.01); *C08G 18/3206* (2013.01); *C08G 18/4238* (2013.01); *C08G 18/44* (2013.01); *C08G 18/4825* (2013.01); *C08G 18/4833* (2013.01); *C08G 18/4854* (2013.01); *C08G 18/664* (2013.01); *C08G 18/6674* (2013.01); *C08G 18/7671* (2013.01); *C08G 18/7685* (2013.01); *C08G 18/837* (2013.01); *C08L 23/06* (2013.01); *C08L 75/04* (2013.01); *C08L 75/08* (2013.01)

(58) Field of Classification Search
CPC ............ C08G 18/6674; C08G 18/2825; C08G 18/2805; C08G 18/283; C08G 18/285; C08G 18/288; C08G 18/289; C08G 18/3206; C08G 18/837; C08G 18/664; C08G 18/4854; C08G 18/44; C08G 18/4238; C08G 18/4833; C08G 18/4825; C08L 75/08; C08L 75/04; C08L 23/06
See application file for complete search history.

(56) References Cited

U.S. PATENT DOCUMENTS

| | | | |
|---|---|---|---|
| 3,718,622 A * | 2/1973 | Camilleri ........... | C08G 18/2825 525/440.01 |
| 4,871,590 A | 10/1989 | Merz et al. | |
| 5,739,250 A | 4/1998 | Kirchmeyer et al. | |
| 2008/0292902 A1 | 11/2008 | Reid et al. | |
| 2009/0264614 A1 * | 10/2009 | Hayashi ............. | C08G 18/0871 528/85 |

FOREIGN PATENT DOCUMENTS

DE     2418075     10/1975

* cited by examiner

*Primary Examiner* — Rabon Sergent
(74) *Attorney, Agent, or Firm* — Eryn Ace Furher; Teresan W. Gilbert

(57) ABSTRACT

The present invention relates to novel thermoplastic polyurethane (TPU) compositions that have crystalline chain ends. The TPU compositions of the invention can provide improved resiliency, lower surface free energy, and/or reduced stickiness, while maintaining other desirable physical properties. The present invention also provides the described TPU compositions that are further grafted with vinyl alkoxysilane moieties allowing for crosslinked networks of the TPU compositions. The present invention also provides plasticizer-free, very soft TPU compositions without the processing difficulties often associated with such materials. The invention further provides means of reducing the surface tension of a TPU composition which can allow for improved blend compositions, and means of crosslinking the described TPU compositions.

19 Claims, No Drawings

THERMOPLASTIC POLYURETHANES WITH CRYSTALLINE CHAIN ENDS

CROSS REFERENCE TO RELATED APPLICATION

This application claims priority from PCT Application Ser. No. PCT/US2013/064763 filed on Oct. 14, 2013, which claims the benefit of U.S. Provisional Application No. 61/720,563 filed on Oct. 31, 2012.

FIELD OF THE INVENTION

The present invention relates to novel thermoplastic polyurethane (TPU) compositions that have crystalline chain ends. The TPU compositions of the invention can provide improved resiliency, lower surface free energy, and/or reduced stickiness, while maintaining other desirable physical properties. The present invention also provides the described TPU compositions that are further grafted with vinyl alkoxysilane moieties allowing for crosslinked networks of the TPU compositions. The present invention also provides very soft TPU compositions without the processing difficulties often associated with such materials. The invention further provides means of reducing the surface tension of a TPU composition which can allow for improved blend compositions, and means of crosslinking the described TPU compositions.

BACKGROUND OF THE INVENTION

Thermoplastic polyurethane (TPU) compositions are highly useful materials that can provide an attractive combination of physical properties. TPUs may be generally described as segmented copolymers, having one or more low glass transition temperature (Tg) soft segments and one or more high Tg hard segments.

There is a continuing need to provide improved TPU compositions that provide improved physical properties, that are easier to process, that are easier to scale to commercial quantities, that can be made via a continuous process, that are more versatile in how they can be used with other materials, or some combination thereof.

There is an ongoing need for TPU compositions that can be more easily processed, and which have improved processing windows, and more specifically, can be scaled to continuous commercial quantity processes. Many TPU compositions have very narrow processing windows, a very tight set of conditions under which they process well. Small changes in processing conditions, which cannot always be easily controlled, can lead to significant variations in product quality. Thus, there are many TPU compositions that could be made in the lab, and which could have interesting combinations of properties, but which effectively cannot be commercialized because they cannot be produced in commercially effective processes.

Thus, there is a need for TPU compositions that can be more easily processed, and which have improved processing windows, which are not as sensitive to changes in processing conditions, including developing TPU compositions with desired combinations of properties that can be produced in commercially effective processes, for example, continuous reactive extruders.

Also, there is an ongoing need for softer TPU compositions that can be easily processed. It is understood that as the amount of hard segment in the TPU is increased, the resulting material gets harder and harder, and likewise, reducing the amount of hard segment in the TPU can result in softer and softer TPU. However, there is a lower limit of hardness that can be reached by changing the hard segment content or type or soft segment content and type. Below this lower limit, the TPU starts losing its strength and becomes too sticky. It becomes more difficult to handle and process, due to the increased stickiness, etc., and eventually becomes impossible to process and/or manufacture. Thus, this lower limit prevents the production and use of "ultra-soft" TPU compositions.

Traditionally, the lowest hardness that can be achieved in a processable TPU without using plasticizer is about Shore 65-70A. However, production of even these TPU compositions is very challenging due to lower solidification or crystallization rates and ever present sticking issues (the TPU composition literally sticks to all equipment surfaces it contacts and to itself). Using a plasticizer in the TPU composition can bring the hardness down to lower values but often times plasticizers are not desired due to their toxicity (phthalate type plasticizers in particular are relatively toxic and not acceptable in many applications) and/or incompatibility (many plasticizers cause blooming in the resulting TPU composition).

Thus, there is always a need for more processable (i.e., extrudable, moldable, etc.), ultra-soft (i.e., Shore hardness below 65A), TPU compositions and methods of making the same. There is particularly a need for plasticizer-free TPU compositions that are ultra-soft and processable. There is also a need for crosslinked TPU networks made from such TPU's and processes of making the same. The present invention addresses these needs.

There is an ongoing need for TPU compositions that can be easily cross-linked. One method of providing cross-linkable TPU compositions is to graft a cross-linkable group or moiety onto the TPU itself and then cross-linking the groups to give a cross-linked TPU network. However, many cross-linkable groups or moieties, like vinyl alkoxysilane moieties, are difficult or even impossible to graft on to TPU compositions.

Thus, there is a need for a TPU compositions that can be easily grafted with a cross-linkable group or moiety, like a vinyl alkoxysilane moiety, thus allowing for easily cross-linkable TPU compositions.

There is also a need to provide a TPU that is more compatible with other polymers, particularly polyolefins. Blending TPU compositions, which are generally considered to be expensive materials, with less expensive materials, for example, polyolefins is an attractive goal for many manufactures that make products from TPU compositions. The blend would be less expensive than using all TPU to make their products. However, TPU compositions generally have poor compatibility with other polymers like polyolefins, resulting in blends that process poorly, have poor physical properties, or other drawbacks.

Thus, there is a need for TPU compositions that have improved compatibility with other polymers like polyolefins, thus allowing for the preparation and use of blends containing TPU compositions and polymers like polyolefins, while still maintaining the physical properties and quality required by manufactures that make products from TPU compositions.

There is a need for TPU compositions that can be easily cross-linked. As noted above, one method of providing cross-linkable TPU compositions is to graft a cross-linkable group or moiety onto the TPU itself and then cross-linking the groups to give a cross-linked TPU network. However, many cross-linkable groups or moieties, like vinyl alkoxysilane moieties, are difficult or even impossible to graft on to TPU compositions. In addition, this grafting step, even if it can be done easily, adds cost and complexity. A more ideal result would be a TPU that is readily cross-linkable without the need for a grafting step at all.

Thus, there is a need for TPU compositions that are easily cross-linkable with the need to graft a group or moiety onto the TPU first.

Various embodiments of the invention described herein address one or more of the needs described above.

SUMMARY OF THE INVENTION

The present invention provides a thermoplastic polyurethane (TPU) composition includes the reaction product of (i) a polyisocyanate component, (ii) at least one of a chain extender component and a polyol component, and (iii) a chain terminator component. The chain terminator component comprises a short chain crystalline compound containing more than 12 carbon atoms and a single NCO-reactive functional group capable of terminating the chain of a TPU resulting from the reaction of components (i) and (ii).

The functional group of the short chain crystalline compound may in some embodiments be described as an active-hydrogen functional group located at a terminal position within the crystalline compound.

The invention further provides TPU compositions where the functional group of the short chain crystalline compound is a hydroxyl (alcohol) functional group, a primary amine functional group, a secondary amine functional group, an anhydride functional group, an epoxy functional group, a thiol functional group, a carboxy (carboxylic acid) functional group, an isocyanate functional group, or a combination thereof. The short chain crystalline compound may be a polyolefin that contains from 20 to 70 carbon atoms. The short chain crystalline compound may include one or more alpha-hydroxy terminated polyalphaolefins or ethoxylated versions thereof. The polyalphaolefin may include a polyethylene, a polypropylene, a poly(ethylene-co-alphaolefin) copolymer, a poly(propylene-co-alphaolefin) copolymer, or any combination thereof.

The invention further provides TPU compositions where the TPU is represented by the following structure:

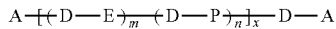

wherein each A is an end group derived from the monofunctional short chain crystalline compound; each D is a group derived from the polyisocyanate component; each E is derived from the chain extender component; each P is derived from the polyol component; each m is an integer from 0 to 15; each n is an integer from 0 to 20; and x is an integer from 1 to 50; with the proviso that at least one of m and n is greater than 0.

The invention further includes any of the TPU compositions described above where: the polyisocyanate component comprises a diisocyanate; where the chain extender component, when present, comprises a diol, a diamine, or a combination thereof; and where the polyol component, when present, comprises a polyether polyol, a polyester polyol, a polycarbonate polyol, a polysiloxane polyol, or a combination thereof. In some embodiments: the polyisocyanate component includes MDI, H12MDI, HDI, TDI, IPDI, LDI, BDI, PDI, CHDI, TODI, NDI or a combination thereof; the chain extender component, when present, comprises ethylene glycol, butanediol, hexamethylenediol, pentanediol, heptanediol, nonanediol, dodecanediol, ethylenediamine, butanediamine, hexamethylenediamine, or a combination thereof; and the polyol component, when present, comprises a poly(ethylene glycol), poly(tetramethylene glycol), poly(trimethylene oxide), ethylene oxide capped poly(propylene glycol), poly(butylene adipate), poly(ethylene adipate), poly(hexamethylene adipate), poly(tetramethylene-co-hexamethylene adipate), poly(3-methyl-1,5-pentamethylene adipate), polycaprolactone diol, poly(hexamethylene carbonate) glycol, poly(pentamethylene carbonate) glycol, poly(trimethylene carbonate) glycol, dimer fatty acid based polyester polyols, vegetable oil based polyols, poly(dimethyl siloxane) polyol, or any combination thereof.

The invention further provides a process of making the TPU compositions, including the steps of: (I) reacting (i) a polyisocyanate component, (ii) at least one of a chain extender component and a polyol component, and (iii) the described chain terminator component; resulting in a TPU with crystalline end groups.

The invention also provides a method of improving the process window of a TPU composition where the method includes the step of: (I) adding the described chain terminator component to a TPU reaction mixture. In some embodiments, the polyol component of the TPU reaction mixtures is present in amounts such that it makes up at least 75 percent by weight of the TPU reaction mixture. In some embodiments, the TPU compositions of the invention can be produced using continuous production processes whereas prior to the application of the invention, TPU compositions like these could only be made in lab scale and/or batch process.

The invention also provides certain embodiments of the invention where the TPU compositions are ultra-soft, which in some embodiments may be defined as having a Shore hardness of below 65A, even in some embodiments without the use of a plasticizer. In some of these embodiments, the polyisocyanate component comprises a diisocyanate; the chain extender component, when present, comprises a diol; and the polyol component, when present, comprises a polyether polyol, a polyester polyol, or a combination thereof.

The invention further provides certain embodiments of the invention where the TPU compositions where the monofunctional short chain crystalline end group of the resulting TPU is then also grafted with a vinyl alkoxysilane moiety in the presence of a peroxide.

The invention also includes such vinyl alkoxysilane grafted TPU compositions where the TPU is crosslinked by formation of siloxane crosslinks upon hydrolysis and subsequent condensation of the alkoxysilane groups. This results in a crosslinked network of the TPU.

The invention also includes a process of making such TPU compositions where the process includes the steps of: (I) reacting (i) a polyisocyanate component, (ii) at least one of a chain extender component and a polyol component, and (iii) a chain terminator component. The chain terminator component may include a short chain crystalline compound containing more than 12 carbon atoms and a single NCO-reactive functional group capable of terminating the chain of a thermoplastic polyurethane resulting from the reaction of components (i) and (ii). This reaction results in a TPU with crystalline end groups, where the resulting TPU with crystalline end groups is further reacted with a crosslinkable vinyl alkoxysilane moiety in the presence of a peroxide resulting in a TPU with crystalline end groups where the crystalline end groups contain a crosslinkable vinyl alkoxysilane group.

The invention further includes the process where such TPU compositions are crosslinked by formation of siloxane crosslinks upon hydrolysis and subsequent condensation of the alkoxysilane groups, resulting in a crosslinked network of the TPU.

The invention includes a method of reducing the surface tension of a TPU composition where the method includes the step of: (I) adding the described chain terminator component to a TPU reaction mixture, resulting in a TPU with a surface tension lower than that of a corresponding TPU made without the chain terminator component.

The invention also includes the TPU compositions themselves. In some embodiments, the TPU is prepared from a polyisocyanate component that includes a diisocyanate; a chain extender component that includes a diol; and a polyol component that includes a polyether polyol.

The invention also includes blends of the described TPU compositions with one or more other polymers, for example with one or more other polyolefins. The TPU of the invention, with their lower surface tension, are more compatible with other polymers, particularly polyolefins, allowing for improved blend compositions made from the described TPU and one or more polyolefins.

The invention also includes articles made from the described TPU compositions. These articles include extruded parts, and may include films, sheets, non-woven fabrics, and various other articles, where the article is made from the described TPU compositions, and even when the article is made from the described blends.

The invention also provides a method of making a TPU composition crosslinkable by UV, E-beam or gamma-beam irradiation. This method includes the step of: (I) adding the described chain terminator component, and optionally a photoinitiator, to a TPU reaction mixture. The method results in a TPU that is crosslinkable by UV (when the photoinitiator is present), E-Beam or gamma-beam irradiation. The described method may also include the additional the step of: (II) crosslinking the resulting thermoplastic polyurethane by UV (when the photoinitiator is present), E-Beam or gamma-beam irradiation; resulting in a crosslinked thermoplastic polyurethane network.

Such TPU compositions and cross-linked TPU networks, where the TPU is cross-linkable by and/or has been crosslinked by UV (when the photoinitiator is present), E-Beam or gamma-beam irradiation, are also included in the invention. In some embodiments, the TPU is prepared from a polyisocyanate component that includes a diisocyanate; a chain extender component that includes a diol; and a polyol component, when present, that includes a polyether polyol, a polycarbonate polyol, or a combination thereof.

DETAILED DESCRIPTION OF THE INVENTION

The TPU compositions of the present invention include the reaction product of (i) a polyisocyanate component, (ii) at least one of a chain extender component and a polyol component, and (iii) a chain terminator component. The chain terminator component includes a short chain crystalline compound containing more than 12 carbon atoms and a single NCO-reactive functional group capable of terminating the chain of a thermoplastic polyurethane resulting from the reaction of components (i) and (ii).

In some embodiments, the TPU includes reaction product of (i) the polyisocyanate component, (ii) the chain extender component, and (iii) the chain terminator component. In such embodiments, the reaction may be essentially free of or even completely free of any polyol component.

In some embodiments, the TPU includes the reaction product of (i) the polyisocyanate component, (ii) the polyol component, and (iii) the chain terminator component. In such embodiments, the reaction may be essentially free of or even completely free of any chain extender component.

In some embodiments, the TPU includes reaction product of (i) the polyisocyanate component, (ii) the chain extender component and the polyol component, and (iii) the chain terminator component.

In any of these embodiments, the molar ratio of the NCO groups provided by the compounds making up component (i) and the NCO reactive groups provided by the compounds making up components (ii) and (iii), for example, —OH groups, may be from 0.92 to 1.08, or from 0.96 to 1.04, or from 0.98 to 1.02, or from 0.99 or 1.01, or even about 1. That is, the molar ratio of NCO groups over NCO reactive groups present in the reaction mixture used to prepare the described TPU may from 0.92 to 1.08, or from 0.96 to 1.04, or from 0.98 to 1.02, or from 0.99 or 1.01, or even about 1.

In some embodiments, the TPU is represented by the following structure:

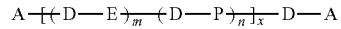

wherein each A is an end group derived from the monofunctional short chain crystalline compound; each D is a group derived from the polyisocyanate component; each E is derived from the chain extender component; each P is derived from the polyol component; each m is an integer from 0 to 15; each n is an integer from 0 to 20; and x is an integer from 1 to 50; with the proviso that at least one of m and n is greater than 0.

In some embodiments, m in the structure above is from 0 to 15, or 0 to 10, or 0 to 5, or 1 to 15, or 5 to 15, or even 5 to 10. In some embodiments, n in the structure above is from 0 to 20, or 0 to 15, or 0 to 10, or 0 to 5, or 1 to 20, or 5 to 20, or 5 to 15, or 5 to 10, or 10 to 20, or even 10 to 15. In some embodiments, x in the structure above is from 1 to 50, or 10 to 50, or 20 to 50, or 20 to 40, or even 25 to 35.

The Polyisocyanate Component

The TPU compositions of the invention are made using (i) a polyisocyanate component, which includes one or more polyisocyanates. In some embodiments, the polyisocyanate component includes one or more diisocyanates.

Suitable polyisocyanates include aromatic diisocyanates, aliphatic diisocyanates, or combinations thereof. In some embodiments, the polyisocyanate component of the invention includes one or more aromatic diisocyanates. In some embodiments, the polyisocyanate component of the invention is essentially free of, or even completely free of, aliphatic diisocyanates.

Examples of useful polyisocyanates include aromatic diisocyanates such as 4,4'-methylenebis(phenyl isocyanate) (MDI), m-xylene diisocyanate (XDI), phenylene-1,4-diisocyanate, naphthalene-1,5-diisocyanate, and toluene diisocyanate (TDI); as well as aliphatic diisocyanates such as isophorone diisocyanate (IPDI), 1,4-cyclohexyl diisocyanate (CHDI), decane-1,10-diisocyanate, lysine diisocyanate (LDI), 1,4-butane diisocyanate (BDI), isophorone diisocyanate (PDI), 3,3-Dimethyl-4,4-biphenylene diisocyanate (TODI), 1,5-naphthalene diisocyanate (NDI), and dicyclohexylmethane-4,4'-diisocyanate (H12MDI). Mixtures of two or more polyisocyanates may be used. In some embodiments, the polyisocyanate is MDI and/or H12MDI. In some embodiments, the polyisocyanate includes MDI. In some embodiments, the polyisocyanate may include H12MDI. In some embodiments, the polyisocyanate component of the invention is essentially free of, or even completely free of, hexamethylene diisocyanate (HDI).

The Chain Extender Component

The TPU compositions of the invention are made using (ii) at least one of a chain extender component and a polyol component. In some embodiments, a chain extender component is present. Chain extenders include diols, diamines, and combination thereof.

Suitable chain extenders include relatively small polyhydroxy compounds, for example lower aliphatic or short chain glycols having from 2 to 20, or 2 to 12, or 2 to 10 carbon atoms. Suitable examples include ethylene glycol, diethylene glycol, propylene glycol, dipropylene glycol, 1,4-butanediol (BDO), 1,6-hexanediol (HDO), 1,3-butanediol, 1,5-pentanediol, neopentylglycol, 1,4-cyclohexanedimethanol (CHDM), 2,2-bis[4-(2-hydroxyethoxyl)phenyl] propane (HEPP), hexamethylenediol, heptanediol, nonanediol, dodecanediol, ethylenediamine, butanediamine, hexamethylenediamine, and hydroxyethyl resorcinol (HER), and the like, as well as mixtures thereof. In some embodiments, the chain extender includes BDO, HDO, or a combination thereof. In some embodiments, the chain extender includes BDO. Other glycols, such as aromatic glycols could be used, but in some embodiments the TPUs of the invention are essentially free of or even completely free of such materials.

In some embodiments, the chain extender used to prepare the TPU is substantially free of, or even completely free of, 1,6-hexanediol. In some embodiments, the chain extender used to prepare the TPU includes a cyclic chain extender. Suitable examples include CHDM, HEPP, HER, and combinations thereof. In some embodiments, the chain extender used to prepare the TPU includes an aromatic cyclic chain extender, for example HEPP, HER, or a combination thereof. In some embodiments, the chain extender used to prepare the TPU includes an aliphatic cyclic chain extender, for example, CHDM. In some embodiments, the chain extender used to prepare the TPU is substantially free of, or even completely free of aromatic chain extenders, for example aromatic cyclic chain extenders. In some embodiments, the chain extender used to prepare the TPU is substantially free of, or even completely free of polysiloxanes.

In some embodiments, the chain extender component, when present, includes ethylene glycol, butanediol, hexamethylenediol, pentanediol, heptanediol, nonanediol, dodecanediol, ethylenediamine, butanediamine, hexamethylenediamine, or a combination thereof.

The Polyol Component

The TPU compositions of the invention are made using (ii) at least one of a chain extender component and a polyol component. In some embodiments the polyol component is present. Polyols include polyether polyols, polyester polyols, polycarbonate polyols, polysiloxane polyols, and combinations thereof.

Suitable polyols, which may also be described as hydroxyl terminated intermediates, when present, may include one or more hydroxyl terminated polyesters, one or more hydroxyl terminated polyethers, one or more hydroxyl terminated polycarbonates, one or more hydroxyl terminated polysiloxanes, or mixtures thereof.

Suitable hydroxyl terminated polyester intermediates include linear polyesters having a number average molecular weight (Mn) of from about 500 to about 10,000, from about 700 to about 5,000, or from about 700 to about 4,000, and generally have an acid number generally less than 1.3 or less than 0.5. The molecular weight is determined by assay of the terminal functional groups and is related to the number average molecular weight. The polyester intermediates may be produced by (1) an esterification reaction of one or more glycols with one or more dicarboxylic acids or anhydrides or (2) by transesterification reaction, i.e., the reaction of one or more glycols with esters of dicarboxylic acids. Mole ratios generally in excess of more than one mole of glycol to acid are preferred so as to obtain linear chains having a preponderance of terminal hydroxyl groups. Suitable polyester intermediates also include various lactones such as polycaprolactone typically made from $\epsilon$-caprolactone and a bifunctional initiator such as diethylene glycol. The dicarboxylic acids of the desired polyester can be aliphatic, cycloaliphatic, aromatic, or combinations thereof. Suitable dicarboxylic acids which may be used alone or in mixtures generally have a total of from 4 to 15 carbon atoms and include: succinic, glutaric, adipic, pimelic, suberic, azelaic, sebacic, dodecanedioic, isophthalic, terephthalic, cyclohexane dicarboxylic, and the like. Anhydrides of the above dicarboxylic acids such as phthalic anhydride, tetrahydrophthalic anhydride, or the like, can also be used. Adipic acid is a preferred acid. The glycols which are reacted to form a desirable polyester intermediate can be aliphatic, aromatic, or combinations thereof, including any of the glycol described above in the chain extender section, and have a total of from 2 to 20 or from 2 to 12 carbon atoms. Suitable examples include ethylene glycol, 1,2-propanediol, 1,3-propanediol, 1,3-butanediol, 1,4-butanediol, 1,5-pentanediol, 1,6-hexanediol, 2,2-dimethyl-1,3-propanediol, 1,4-cyclohexanedimethanol, decamethylene glycol, dodecamethylene glycol, and mixtures thereof.

Suitable hydroxyl terminated polyether intermediates include polyether polyols derived from a diol or polyol having a total of from 2 to 15 carbon atoms, in some embodiments an alkyl diol or glycol which is reacted with an ether comprising an alkylene oxide having from 2 to 6 carbon atoms, typically ethylene oxide or propylene oxide or mixtures thereof. For example, hydroxyl functional polyether can be produced by first reacting propylene glycol with propylene oxide followed by subsequent reaction with ethylene oxide. Primary hydroxyl groups resulting from ethylene oxide are more reactive than secondary hydroxyl groups and thus are preferred. Useful commercial polyether polyols include poly(ethylene glycol) comprising ethylene oxide reacted with ethylene glycol, polypropylene glycol) comprising propylene oxide reacted with propylene glycol, poly(tetramethylene glycol) comprising water reacted with tetrahydrofuran (PTMEG). In some embodiments, the polyether intermediate includes PTMEG. Suitable polyether polyols also include polyamide adducts of an alkylene oxide and can include, for example, ethylenediamine adduct comprising the reaction product of ethylenediamine and propylene oxide, diethylenetriamine adduct comprising the reaction product of diethylenetriamine with propylene oxide, and similar polyamide type polyether polyols. Copolyethers can also be utilized in the current invention. Typical copolyethers include the reaction product of THF and ethylene oxide or THF and propylene oxide. These are available from BASF as Poly THF B, a block copolymer, and poly THF R, a random copolymer. The various polyether intermediates generally have a number average molecular weight (Mn) as determined by assay of the terminal functional groups which is an average molecular weight greater than about 700, such as from about 700 to about 10,000, from about 1000 to about 5000, or from about 1000 to about 2500. In some embodiments, the polyether intermediate includes a blend of two or more different molecular weight polyethers, such as a blend of 2000 $M_n$ and 1000 $M_n$ PTMEG.

Suitable hydroxyl terminated polycarbonates include those prepared by reacting a glycol with a carbonate. U.S. Pat. No. 4,131,731 is hereby incorporated by reference for its disclosure of hydroxyl terminated polycarbonates and their preparation. Such polycarbonates are linear and have terminal hydroxyl groups with essential exclusion of other terminal groups. The essential reactants are glycols and carbonates. Suitable glycols are selected from cycloaliphatic and aliphatic diols containing 4 to 40, and or even 4 to 12 carbon atoms, and from polyoxyalkylene glycols containing 2 to 20 alkoxy groups per molecular with each alkoxy group containing 2 to 4 carbon atoms. Diols suitable for use in the present invention include aliphatic diols containing 4 to 12 carbon atoms such as butanediol-1,4, pentanediol-1,5, neopentyl glycol, hexanediol-1,6,2,2,4-trimethylhexanediol-1,6, decanediol-1,10, hydrogenated dilinoleylglycol, hydrogenated dioleylglycol; and cycloaliphatic diols such as cyclohexanediol-1,3, dimethylolcyclohexane-1,4, cyclohexanediol-1,4, dimethylolcyclohexane-1,3,1,4-endomethylene-2-hydroxy-5-hydroxymethyl cyclohexane, and polyalkylene glycols. The diols used in the reaction may be a single diol or a mixture of diols depending on the properties desired in the finished product. Polycarbonate intermediates which are hydroxyl terminated are generally those known to the art and in the literature. Suitable carbonates are selected from alkylene carbonates composed of a 5 to 7 member ring. Suitable carbonates for use herein include ethylene carbonate, trimethylene carbonate, tetramethylene carbonate, 1,2-propylene carbonate, 1,2-butylene carbonate, 2,3-butylene carbonate, 1,2-ethylene carbonate, 1,3-pentylene carbonate, 1,4-pentylene carbonate, 2,3-pentylene carbonate, and 2,4-pentylene carbonate. Also, suitable herein are dialkylcarbonates, cycloaliphatic carbonates, and diarylcarbonates. The dialkylcarbonates can contain 2 to 5 carbon atoms in each alkyl group and specific examples thereof are diethylcarbonate and dipropylcarbonate. Cycloaliphatic carbonates, especially dicycloaliphatic carbonates, can contain 4 to 7 carbon atoms in each cyclic structure, and there can be one or two of such structures. When one group is cycloaliphatic, the other can be either alkyl or aryl. On the other hand, if one group is aryl, the other can be alkyl or cycloaliphatic. Examples of suitable diarylcarbonates, which can contain 6 to 20 carbon atoms in each aryl group, are diphenylcarbonate, ditolylcarbonate, and dinaphthylcarbonate.

Suitable polysiloxane polyols include alpha-omega-hydroxyl or amine or carboxylic acid or thiol or epoxy terminated polysiloxanes. Examples include poly(dimethysiloxane) terminated with a hydroxyl or amine or carboxylic acid or thiol or epoxy group. In some embodiments, the polysiloxane polyols are hydroxyl terminated polysiloxanes. In some embodiments, the polysiloxane polyols have a number-average molecular weight in the range from 300 to 5000, or from 400 to 3000.

Polysiloxane polyols may be obtained by the dehydrogenation reaction between a polysiloxane hydride and an aliphatic polyhydric alcohol or polyoxyalkylene alcohol to introduce the alcoholic hydroxy groups onto the polysiloxane backbone.

In some embodiments, the polysiloxanes may be represented by one or more compounds having the following formula:

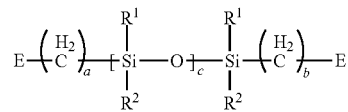

in which: each $R^1$ and $R^2$ are independently a 1 to 4 carbon atom alkyl group, a benzyl, or a phenyl group; each E is OH or $NHR^3$ where $R^3$ is hydrogen, a 1 to 6 carbon atoms alkyl group, or a 5 to 8 carbon atoms cyclo-alkyl group; a and b are each independently an integer from 2 to 8; c is an integer from 3 to 50. In amino-containing polysiloxanes, at least one of the E groups is $NHR_3$. In the hydroxyl-containing polysiloxanes, at least one of the E groups is OH. In some embodiments, both $R^1$ and $R^2$ are methyl groups.

Suitable examples include alpha-omega-hydroxypropyl terminated poly(dimethysiloxane) and alpha-omega-amino propyl terminated poly(dimethysiloxane), both of which are commercially available materials. Further examples include copolymers of the poly(dimethysiloxane) materials with a poly(alkylene oxide).

The polyol component, when present, may include poly (ethylene glycol), poly(tetramethylene glycol), poly(trimethylene oxide), ethylene oxide capped poly(propylene glycol), poly(butylene adipate), poly(ethylene adipate), poly (hexamethylene adipate), poly(tetramethylene-co-hexamethylene adipate), poly(3-methyl-1,5-pentamethylene adipate), polycaprolactone diol, poly(hexamethylene carbonate) glycol, poly(pentamethylene carbonate) glycol, poly (trimethylene carbonate) glycol, dimer fatty acid based polyester polyols, vegetable oil based polyols, or any combination thereof.

Examples of dimer fatty acids that may be used to prepare suitable polyester polyols include Priplast™ polyester gylcols/polyols commercially available from Croda and Radia® polyester glycols commercially available from Oleon.

In some embodiments, the polyol component includes a polyether polyol. In some embodiments, the polyol component is essentially free of or even completely free of polyester polyols. In some embodiments, the polyol component used to prepare the TPU is substantially free of, or even completely free of polysiloxanes.

The Chain Terminator Component

The TPU compositions of the invention are made using (iii) a chain terminator component. The chain terminator component includes a short chain crystalline compound containing more than 12 carbon atoms and a single NCO-reactive functional group capable of terminating the chain of a TPU resulting from the reaction of components (i) and (ii).

In some embodiments, the short chain crystalline compound is a short chain crystalline polyolefin. By "short chain", it is meant that the crystalline compound contains less than 200 carbon atoms, or even less than 100, 75, 70, 63, 60 or even 50 carbon atoms, but always more than 12 carbon atoms. In some embodiments, the short chain crystalline compounds contain from 13 to 70, 20 to 70, 23 to 63, or even from 24 to 50 carbon atoms. Generally speaking, the short chain crystalline compounds are linear.

The single functional group of the short chain crystalline compound may be an NCO-reactive functional group located at a terminal position within the crystalline compound. In other embodiments, the single functional group may be described as an active-hydrogen functional group, again located at a terminal position within the crystalline compound. Suitable functional groups include a hydroxyl (alcohol) functional group, a primary amine functional group, a secondary amine functional group, an anhydride functional group, an epoxy functional group, a thiol functional group, a carboxy (carboxylic acid) functional group, a isocyanate functional group, or a combination thereof.

In some embodiments, the short chain crystalline compound is a compound with an amine functional group, a carboxylic acid functional group, or a hydroxyl (alcohol) functional group. In some embodiments, the short chain crystalline compound is a hydroxyl (alcohol) functional group. In some embodiments, isocyanate functional groups are excluded from the invention that is the short chain crystalline compound may be essentially free of or even completely free of isocyanate functional groups, including diisocyanate functional groups.

In some embodiments, the short chain crystalline compound comprises one or more alpha-hydroxy terminated polyalphaolefins or ethoxylated versions thereof. Useful polyalphaolefins include polyethylene, polypropylene, poly(ethylene-co-alphaolefin) copolymer, poly(propylene-co-alphaolefin) copolymer, or any combination thereof.

It is important that the short chain crystalline compound have a single functional group, as the mono-functional nature of the compound is required in order to control the stoichiometry of the TPU forming reaction. If the short chain crystalline compound is not mono-functional (if it contains more than one functional group), it will not act as a chain terminator, but rather as an additional chain extender. It is understood that some amount of multi-functional material may be present in the short chain crystalline compound, however, the present invention contemplates the chain terminator component being at least mostly mono-functional short chain crystalline compounds, and in some embodiments at least 70, 80, 90, or even 99.5 percent by weight mono-functional short chain crystalline compounds. In still other embodiments, the chain terminator component is essentially free of or even completely free of multi-functional compounds.

In some embodiments, the chain terminator component is essentially free of, or even completely free of crystalline hydrocarbon waxes.

In some embodiments, the chain terminator component includes polyethylene mono alcohols, ethoxylated polyethylene mono alcohols, carboxylic acid terminated polyethylene, or any combination thereof.

Commercial examples of such mono-functional short chain crystalline compounds useful in the present invention include UNILIN™ alcohols, UNITHOX™alcohols, and UNICID™ acids, all of which are commercially available from Baker Hughes. UNILIN™ 350 is a C33 crystalline monol chain terminator. UNILIN™ 700 is a C63 crystalline monol chain terminator.

In some embodiments of the invention, the polyisocyanate component includes a diisocyanate; the chain extender component, when present, includes a diol, a diamine, or a combination thereof; and the polyol component, when present, includes a polyether polyol, a polyester polyol, a polycarbonate polyol, or a combination thereof.

In some embodiments of the invention, the polyisocyanate component comprises MDI, H12MDI, HDI, TDI, IPDI, LDI, BDI, PDI, TODI, NDI or a combination thereof; the chain extender component, when present, comprises ethylene glycol, butanediol, hexamethylenediol, pentanediol, heptanediol, nonanediol, dodecanediol, ethylenediamine, butanediamine, hexamethylenediamine, or a combination thereof; and the polyol component, when present, comprises a poly(ethylene glycol), poly(tetramethylene glycol), poly(trimethylene oxide), ethylene oxide capped polypropylene glycol), poly(butylene adipate), poly(ethylene adipate), poly(hexamethylene adipate), poly(tetramethylene-co-hexamethylene adipate), poly(3-methyl-1,5-pentamethylene adipate), polycaprolactone diol, poly(hexamethylene carbonate) glycol, poly(pentamethylene carbonate) glycol, poly(trimethylene carbonate) glycol, dimer fatty acid based polyester polyols, vegetable oil based polyols, or any combination thereof.

In still further embodiments, the compositions of the invention may further include one or more polyolefins. That is, the compositions of the invention may also include blends of one or more of the described TPU's with one or more additional polymers, for example, one or more polyolefins. Such additional components, for example, such additional polyolefins, are not overly limited. In some embodiments, these blends are essentially free of or even completely free of thermoplastics other than the TPU of the invention.

The TPU of the invention may be prepared by a process that includes the steps of: (I) reacting (i) the polyisocyanate component, (ii) at least one of the chain extender component and the polyol component, and (iii) the chain terminator component. The resulting TPU has crystalline end groups where the short chain crystalline compound of the chain terminator component forms the end groups of the TPU chains. Any of the TPU materials described herein may be made by this process.

The described process for preparing the TPU of the invention includes both the "pre-polymer" process and the "one shot" process, in either a batch or continuous manner. That is, in some embodiments, the TPU may be made by reacting the components together in a "one shot" polymerization process wherein all of the components, including reactants are added together simultaneously or substantially simultaneously to a heated extruder and reacted to form the TPU. While in other embodiments, the TPU may be made by first reacting the polyisocyanate component with some portion of the polyol component forming a pre-polymer, and then completing the reaction by reacting the pre-polymer with the remaining reactants, resulting in the TPU.

In some embodiments, the components used in the preparation of the TPU are essentially free of or even completely free of maleated materials, including, for example, maleated polyolefins. In some embodiments, the components used in the preparation of the TPU are essentially free of or even completely free of thermoplastics, except for the TPU materials of the invention. In some embodiments, the TPU of the invention is made via a prepolymer process where a single prepolymer composition is used. In some embodiments, the TPU of the invention is made via continuous process.

Additional Components

The TPU compositions of the invention may also include one or more additional components.

In some embodiments, the additional component is a flame retardant. Suitable flame retardants are not overly limited and may include a boron phosphate flame retardant, a magnesium oxide, a dipentaerythritol, a polytetrafluoroethylene (PTFE) polymer, or any combination thereof. In some embodiments, this flame retardant may include a boron phosphate flame retardant, a magnesium oxide, a dipentaerythritol, or any combination thereof. A suitable example of a boron phosphate flame retardant is BUDIT 326, commercially available from Budenheim USA, Inc.

When present, the flame retardant component may be present in an amount from 0 to 10 weight percent of the overall TPU composition, in other embodiments from 0.5 to 10, or from 1 to 10, or from 0.5 or 1 to 5, or from 0.5 to 3, or even from 1 to 3 weight percent of the overall TPU composition.

The TPU compositions of the invention may also include additional additives, which may be referred to as a stabilizer. The stabilizers may include antioxidants such as phenolics, phosphites, thioesters, and amines, light stabilizers such as hindered amine light stabilizers and benzothiazole UV absorbers, and other process stabilizers and combinations thereof. In one embodiment, the preferred stabilizer is Irganox 1010 from Ciba-Geigy Corp. and Naugard 445 from Chemtura. The stabilizer is used in the amount from about 0.1 weight percent to about 5 weight percent, in another embodiment from about 0.1 weight percent to about 3 weight percent, and in another embodiment from about 0.5 weight percent to about 1.5 weight percent of the TPU composition.

In addition, various conventional inorganic flame retardant components may be employed in the TPU composition. Suitable inorganic flame retardants include any of those known to one skilled in the art, such as metal oxides, metal oxide hydrates, metal carbonates, ammonium phosphate, ammonium polyphosphate, calcium carbonate, antimony oxide, clay, mineral clays including talc, kaolin, wollastonite, nanoclay, montmorillonite clay which is often referred to as nano-clay, and mixture thereof. In one embodiment, the flame retardant package includes talc. The talc in the flame retardant package promotes properties of high LOI. The inorganic flame retardants may be used in the amount from 0 to about 30 weight percent, from about 0.1 weight percent to about 20 weight percent, in another embodiment about 0.5 weight percent to about 15 weight percent of the total weight of the TPU composition.

Still further optional additives may be used in the TPU compositions of the invention as well. The additives include colorants, antioxidants (including phenolics, phosphites, thioesters, and/or amines), antiozonants, stabilizers, inert fillers, lubricants, inhibitors, hydrolysis stabilizers, light stabilizers, hindered amines light stabilizers, benzotriazole UV absorber, heat stabilizers, stabilizers to prevent discoloration, dyes, pigments, inorganic and organic fillers, reinforcing agents and combinations thereof.

All of the additives described above may be used in an effective amount customary for these substances. The non-flame retardants additives may be used in amounts of from about 0 to about 30 weight percent, in one embodiment from about 0.1 to about 25 weight percent, and in another embodiment about 0.1 to about 20 weight percent of the total weight of the TPU composition.

These additional additives can be incorporated into the components of, or into the reaction mixture for, the preparation of the TPU resin, or after making the TPU resin. In another process, all the materials can be mixed with the TPU resin and then melted or they can be incorporated directly into the melt of the TPU resin.

INDUSTRIAL APPLICATION

In some embodiments, the present invention provides TPU compositions that have improved processing windows. The stickiness and/or tackiness is one aspect of processing, but there are others as well, and many TPU compositions have very narrow processing windows, a very tight set of conditions under which they process well. Sometimes just slightly increasing the throughput of an extruder can change the processing conditions enough that a given TPU shifts out of its processing window and the product process suffers. As noted above there is a need to improve the overall processability of TPU compositions, to broaden the TPU composition's processing window, making it less sensitive to processing changes, and so improving the quality of the final material (more uniform TPU, less deviances across a lot of materials that can be caused by slight changes in processing conditions, etc.). Stickiness and similar properties make it much harder to process TPU compositions, and at some point the processing issues become so great that the TPU composition cannot be processed effectively. This point where the TPU composition is not processable may generally include the point where the product coming from the process is not uniform in quality or production rate, where the production equipment becomes repeatedly blocked and/or impaired by material build-up, and/or where the product sticks to the equipment to the extent that it cannot be handled, collected, further processes and packaged, and/or sampled, etc. These processing problems have been a significant barrier to producing ultra-soft TPU.

By reducing the stickiness of the TPU composition, the processing window for these materials can be greatly improved, that is the processing conditions under which these TPU compositions can be successfully processed without being overwhelmed by the problems and challenges described above. Providing a TPU composition, in some embodiments without using a plasticizer, that can be processed in "normal" way is a significant step forward and will allow the commercialization of TPU compositions, including ultra-soft TPU compositions, which previously could not be processed successfully or at least consistently well. Another way to describe the improvement provided by the invention is to say the TPU compositions of the invention have improved extrudability and/or that they experience less or even no sticking. In some embodiments, the TPU compositions of the invention can be processed in commercial scale continuous extruders, whereas the corresponding non-inventive TPU composition cannot be (results in a TPU composition that cannot be tested and/or is unsuitable for the desired application). In addition, completely amorphous (no crystallization point) TPU, like some polycarbonate TPU, have a high degree of phase mixing and so longer solidification times resulting in significant processing issues such as tackiness when this material is extruded into sheet or tubing. Such materials can be very difficult to polymerize on a commercial scale (in a continuous extruder) and would be very difficult to further process into finished articles (via extruding, molding, etc.). The compositions of the invention solve this problem. The invention compositions will have sharp Tc transitions, and significantly reduced and even eliminated tackiness issues when extruded into sheet.

The more processable TPU compositions of the invention may be described as TPU composition comprising the reaction product of (i) a polyisocyanate component, (ii) at least one of a chain extender component and a polyol component, and (iii) the described chain terminator component. While not wishing to be bound by theory, it is believed that the presence of the described chain terminator component acts to reduce the negative limitations described above, improving the processability, and so broadening the processing window of the resulting TPU.

In some embodiments, these processes use soft dimer acid based glycols and/or polycarbonate glycols to produce the TPU. These TPU's are amorphous and tend to stick to equipment and even block equipment during processing. In some embodiments, the process involves adding a chain terminator component to the reaction mixture, which will result in a reduction in the amount of sticking and/or blocking seen in the processing equipment.

In some embodiments, a polyol component makes up at least 75 percent by weight of the TPU reaction mixture. In other embodiments, the polyol component makes up at least 77, 78, 79, 80 or even 90 percent by weight of the TPU reaction mixture.

In some embodiments, the soft segment materials (the polyol and/or the chain extender) make up at least 75 percent by weight of the TPU reaction mixture. In other embodiments, the soft segment materials makes up at least 77, 78, 79, 80 or even 90 percent by weight of the TPU reaction mixture.

The invention includes the plasticizer-free ultra-soft TPU compositions with reduced stickiness and/or improved processability described above, and the process of making the same.

The invention also provides the method of making these TPU compositions with improved processability windows. In both the compositions and the processes of making them, in some embodiments, the polyol component makes up at least 75 percent by weight of the thermoplastic polyurethane reaction mixture. In some embodiments, the TPU compositions with improved processability windows is a TPU based on amorphous polyols or TPU with amorphous morphologies. These can include TPU made from dimer fatty acid based polyols (amorphous polyols) and/or aliphatic TPU or aromatic polycarbonate-based TPU (TPU with amorphous morphologies). In some embodiments, the TPU of the compositions of the invention are amorphous aromatic TPU (for example, they are made with an aromatic diisocyanate). In other embodiments, the TPU of the compositions of the invention are amorphous aliphatic TPU (for example, they are made with an aliphatic diisocyanate). In some embodiments, the amorphous aliphatic TPU are made without the use of a chain extender. In some embodiments, the amorphous aliphatic TPU are polyester and/or polycarbonate TPUs and can be made without the use of a polyether polyol.

In some embodiments, these TPU compositions with improved processability windows are made from a diisocyanate, a polycarbonate polyol, a diol chain extender, along with the short chain crystalline chain terminator. In some embodiments, these TPU compositions with improved processability windows are made from a diisocyanate, a polycarbonate polyol, a diol chain extender, along with the short chain crystalline chain terminator.

In some embodiments, the present invention provides TPU compositions that are ultra-soft. By ultra-soft it is meant that the TPU and/or the TPU composition have a Shore hardness below 65A with no plasticizer. As noted above, there are currently practical limits on how soft a commercial TPU can be, as conventional methods of making softer TPU compositions also result in materials that are very tacky and difficult to process. In addition, soft TPU tends to start losing its strength and so has poor physical properties. These limits have severely inhibited the commercial production and use of ultra-soft TPU compositions. In some embodiments, the present invention provides improved TPU compositions and methods of making TPU compositions that provide ultra-soft properties while avoiding these limitations.

The ultra-soft TPU compositions of the invention may be described as TPU composition comprising the reaction product of (i) a polyisocyanate component, (ii) at least one of a chain extender component and a polyol component, and (iii) the described chain terminator component. While not wishing to be bound by theory, it is believed that the presence of the described chain terminator component acts to reduce the negative limitations described above, allowing an ultra-soft TPU composition to be processed while maintaining its other physical properties. Any of the TPU reaction mixtures and/or TPU compositions may be used and/or modified by this process.

In some embodiments, the ultra-soft TPU composition has a Shore hardness below 65A. In some of these embodiments, the hardness level is achieved without the use of a plasticizer (the TPU composition may be free of any plasticizer).

In some embodiments, the TPU composition is prepared from polyisocyanate component that includes a diisocyanate, a chain extender component that includes a diol; and a polyol component, when present, that includes a polyether polyol, a polyester polyol, or a combination thereof. In some embodiments, the ultra-soft TPU compositions are made from a diisocyanate, a polyether and/or polyester polyol, and optionally a diol chain extender, along with the short chain crystalline chain terminator. In some embodiments, the ultra-soft TPU compositions are made from a diisocyanate and a polyether polyol, along with the short chain crystalline chain terminator. In some embodiments, the ultra-soft TPU compositions are made from a diisocyanate, a polyester polyol, and a diol chain extender, along with the short chain crystalline chain terminator.

In some embodiments, the present invention provides TPU compositions that are further modified by grafting a vinyl alkoxysilane moiety onto the TPU chains. This may be completed in the presence of a peroxide. In some embodiments, the grafting step is completed after the formation of the TPU, that is, after the reaction of the components that result in the TPU. Any of the TPU compositions described herein may be grafted with these moieties, resulting in a vinyl alkoxysilane grafted TPU composition. The vinyl alkoxysilane grafted TPU composition may then be easily cross-linked, resulting in a cross-linked TPU network where the crosslinking bonds are siloxane bridges that may be formed by the hydrolysis and subsequent condensation of the alkoxysilane groups. Any of the TPU reaction mixtures and/or TPU compositions may be used and/or modified by this process.

The invention includes the vinyl alkoxysilane grafted TPU compositions described above, the siloxane cross-linked TPU networks formed from such compositions, and the process of making the same. The invention includes the process of making the vinyl alkoxysilane grafted TPU compositions as well as the process of crosslinking such compositions through the hydrolysis of the vinyl alkoxysilane groups, resulting in the cross-linked TPU network described herein. In some embodiments, the polyol used to make these vinyl alkoxysilane grafted TPU has a molecular weight of from 1000 to 2000. In some embodiments, these vinyl alkoxysilane grafted TPU are polyether TPU.

In some embodiments, the present invention provides TPU compositions that have reduced surface tension, which is believe to provide enhance compatibility of the TPU composition with other polymers, particularly polyolefins. Thus, the described TPU compositions provide improved blends with other polymers, particularly non-polar polymers including polyolefins, due to this increased compatibility, resulting in improved physical processing characteristics and physical properties of such blends.

In some embodiments, the polymers used in these blends are polyolefins, for example, polypropylene, polyethylene, copolymers of propylene and ethylene, or combinations thereof. In some embodiments, the blends have a weight ratio of from 1:99 to 99:1, or from 1:9 to 9:1, or from 2:1 to 1:2, or even about 1:1 parts modified TPU compositions to parts polymer, for example polyolefin.

Thus, the invention provides a method of reducing the surface tension of a TPU composition said method including the step of: (I) adding the described chain terminator component to the TPU reaction mixture. The resulting TPU has a surface tension lower than that of a corresponding TPU made without the chain terminator component. In some embodiments, the TPU reaction mixture includes a polyisocyanate component that includes a diisocyanate, a chain extender component that includes a diol, and a polyol component that includes a polyether polyol.

The invention also includes the improved blends made using the described TPU compositions and one or more other polymers, in some embodiments one or more polyolefins. The invention also includes the improved blends made using the described TPU compositions and one or more other polymers, in some embodiments one or more polyolefins. The invention also includes articles made from the described TPU compositions. These articles include films, sheets, non-woven fabrics, and various other articles, where the article is made from the described TPU compositions, and even when the article is made from the described blends. In some embodiments, the TPU compositions with reduced surface tension are made from a diisocyanate, a polyether polyol, and a diol chain extender, along with the short chain crystalline chain terminator.

In some embodiments, the present invention provides TPU compositions that can be readily cross-linked without an additional step of grafting, or some other similar modification. Such an improvement would allow cross-linked TPU networks to be formed much more easily and cheaply, as generally some other step is required (the addition of a cross-linker, the grafting of a cross-linkable group onto the TPU, etc.) is required to provide a cross-linked TPU network.

For such crosslinking to be possible, the chain extender component used to prepare the TPU must have some chain extender material that contains one or more carbon-carbon double bonds. In some embodiments, these chain extenders are glycol chain extenders containing carbon-carbon double bonds, and they are generally used in combination with one or more saturated glycol chain extenders. The glycol chain extender used in making the thermoplastic polyurethane of this invention will be a combination of a saturated glycol chain extender and glycol chain extender containing carbon-carbon double bonds (unsaturated glycol chain extender). The unsaturated glycol chain extender will typically represent about 2 weight percent to about 25 weight percent of the total amount of chain extender utilized in synthesizing the TPU of this invention. The total amount of chain extender is, of course, the sum of the total amount of saturated glycol and unsaturated glycol used in making the TPU. Thus, in this scenario, the unsaturated glycol chain extender will represent about 2 to about 25 weight percent and the saturated glycol chain extender will represent about 75 to about 98 weight percent of the total chain extender utilized. The unsaturated glycol chain extender may represent 5 to 50, or 8 to 50 weight percent of the total chain extender utilized.

The unsaturated glycol will normally represent from about 0.8 to about 10, or 1 to 4, or 1.5 to 3 weight percent of the total weight of the TPU (total weight of hydroxyl terminated intermediate, polyisocyanate, saturated glycol chain extender, and unsaturated glycol chain extender. The saturated chain extender that can be used in synthesizing the TPUs of this invention include organic diols or glycols having from 2 to about 20 carbon atoms, such as alkane diols, including any of the materials described above. Mixtures of the above noted chain extenders can also be utilized. Such materials and their use in more conventional TPU are described in detail is US patent application publication number 2011/0186329, incorporated herein by reference.

Thus, the invention provides a method of making a TPU composition cross-linkable by UV, E-beam or gamma-beam irradiation, said method including the step of: (I) adding the described chain terminator component, and optionally a photoinitiator, to a TPU reaction mixture. This results in a TPU that is cross-linkable by UV (when the photoinitiator is present), E-Beam or gamma-beam irradiation. The invention also provides the method of cross-linking the cross-linkable TPU composition and the resulting cross-linked TPU network.

The photoinitiator is necessary for the UV crosslinking but is optional for E-beam and/or gamma-beam crosslinking Any of the TPU reaction mixtures and/or TPU compositions may be used and/or modified by this process.

In some embodiments, the cross-linkable TPU composition and/or the cross-linked TPU network are made from a diisocyanate, a polycarbonate and/or polyether polyol, and a diol chain extender, along with the short chain crystalline chain terminator.

The invention will be better understood by reference to the following examples.

EXAMPLES

The invention will be further illustrated by the following examples, which sets forth particularly advantageous embodiments. While the examples are provided to illustrate the invention, they are not intended to limit it.

Example Set A

A set of examples is prepared to demonstrate the ultra-soft non-tacky TPU compositions of the invention. The examples of this set are plasticizer free TPU compositions.

Examples A-1 and A-2 polyether TPU compositions each prepared on a lab scale batch process by combining all of their respective components in a reaction vessel which is then heated to 120° C. and reacted for about 3 minutes. The resulting material is then aged for 3 hours at 105° C. Each sample is then tested to evaluate its physical properties. Example A-1 is also analyzed by 2D-TOCSY NMR (total correlation spectroscopy) to confirm the connection between the crystalline chain end and TPU main chain. That is the crystalline chain ends are covalently bonded to the polymer network in the TPU of Example A-2.

The formulations and test results for the examples are summarized in the table below, where are formulation values are weight percentages.

TABLE 1

Lab Scale Examples

|  | Example A-1 Comp | Example A-2 Inventive |
|---|---|---|
| MDI | 20.9 | 20.4 |
| 1000 Mn PTMEG | 78.5 | 76.6 |
| UNILIN ™ 700 (C63) (crystalline) | 0.0 | 3.0 |
| Butyl Carbitol[1] (non-crystalline) | 0.6 | 0.0 |
| Chain terminator to OH equivalents | 2.11 | 2.11 |
| Mw (kDa) via GPC[2] | 260 | 328 |
| Mn (kDa) via GPC[2] | 94 | 112 |
| Tensile Strength (MPa)[3] | 0.19 | 23 |
| Elongation (%)[3] | 2076 | 714 |
| Share A Hardness[4] | 34 | 64 |
| Glass Transition Temp, Tg (° C.)[5] | −48.5 | −48.1 |
| Melting Temp, Tm (° C.)[5] | None | 89.1 |
| Crystallization Temp, Tc (° C.)[5] | None | 71.6 |

[1]Butyl carbitol, (2-(2-butoxyethoxy)ethanol), is a non-crystalline chain terminator available from DOW.
[2]GPC molecular weights are determined against polystyrene standards and are conducted in THF.
[3]Tensile strength and elongation are measured using ASTM D412 using compression molded plaques.
[4]Hardness values are measured using ASTM D2240.
[5]Tg, Tm, and Tc are measured using modulated DSC (ASTM D3418 method). Tg and Tm are obtained from second heating and Tc is obtained from the cooling curves.

In both formulations, no-chain extender was used and the chain terminators are used in the same hydroxyl equivalent values (2.11). Example A-2 is a high strength non-tacky polymer with a low melting temperature and crystallization temperature, all indicating a useful TPU with good processing characteristics. Whereas Example A-1 is extremely sticky with no sufficient mechanical strength and which did not have a measurable melting temperature or crystallization temperature, properties indicating the A-1 Example would be very hard to prepare and to further process on a commercial scale. These lab scale examples show the TPU compositions of the invention (Example A-2) provide a TPU with a desirable combination of properties while avoiding the issues seen in comparable TPU compositions not made according to the invention (Example A-1).

Examples A-3, A-4 and A-5 are polyester TPU compositions each prepared in a research scale continuous extruder where each component is feed into the extrude as a separate stream, except that the additional additives are pre-mixed with the polyol component and charged to the extruder with the polyol. The formulations and test results for the examples are summarized in the table below, where all formulation values are weight percentages.

TABLE 2

Continuous Extruder Examples

|  | Example A-3 Inventive | Example A-4 Inventive | Example A-5 Comp |
|---|---|---|---|
| MDI | 20.1 | 20.2 | 19.9 |
| 1000 Mn BDO-adipate | 78.5 | 76.1 | 79.4 |
| UNILIN ™ 350 (C63) (crystalline) | 1.0 | 3.0 |  |
| UNILIN ™ 700 (C63) (crystalline) |  |  |  |
| Additional Additives[1] | 0.7 | 0.7 | 0.7 |
| Mw (kDa) via GPC[2] | 159 | 117 | Not Tested |
| Mn (kDa) via GPC[2] | 63 | 43 | Not Tested |
| Tensile Strength (MPa)[3] | 9.0 | 11.0 | Not Tested |
| Elongation (%)[3] | 845 | 1010 | Not Tested |
| Share A Hardness[4] | 51 | 54 | Not Tested |
| Glass Transition Temp, Tg (° C.)[5] | −30.1 | −29.6 | Not Tested |
| Melting Temp, Tm (° C.)[5] | 66.5 | 61.9 | Not Tested |
| Crystallization Temp, Tc (° C.)[5] | 70 | 71 | Not Tested |

[1]The same package of additional additives was used in each example.
[2]GPC molecular weights are determined against polystyrene standards and are conducted in THF.
[3]Tensile strength and elongation are measured using ASTM D412 using compression molded plaques.
[4]Hardness values are measured using ASTM D2240.
[5]Tg, Tm, and Tc are measured using modulated DSC (ASTM D3418 method). Tg and Tm are obtained from second heating and Tc is obtained from the cooling curves.

Example A-3 and A-4 are non-tacky, moldable, and soft TPU materials with no processing issues. Both processed well in the research scale extruder and samples of the completed TPU materials could be collected and tested. Both examples showed good physical properties with low melting temperatures and crystallization temperatures, all indicating a useful TPU with good processing characteristics. In contrast, Example A-5 was not processable due to lack of any mechanical strength and extreme sticking of the TPU material inside the equipment. Because of these difficulties no samples could be collected for testing and the TPU proved to be essentially non-processable.

Example Set B

A set of examples is prepared to demonstrate the improved processability of the TPU compositions of the invention. The examples of this set are plasticizer free TPU compositions.

Examples B-1, B-2, B-3, and B-4 are polycarbonate TPU compositions each prepared in a research scale continuous extruder where each component is feed into the extrude as a separate stream, except that the additional additives are pre-mixed with the polyol component and charged to the extruder with the polyol. The formulations and test results for the examples are summarized in the table below, where are formulation values are weight percentages.

TABLE 3

|  | Example B-1 Comp | Example B-2 Inventive | Example B-3 Inventive | Example B-4 Inventive |
|---|---|---|---|---|
| MDI | 28.4 | 28.8 | 28.8 | 29.1 |
| Polycarbonate diol | 61.2 | 58.3 | 56.3 | 54.4 |
| BDO | 7.5 | 7.5 | 7.5 | 7.5 |
| UNILIN ™ 700 (C63) (crystalline) | 0.0 | 3.0 | 5.0 | 7.0 |
| Additional Additives[1] | 2.9 | 2.5 | 2.4 | 2.0 |
| Glass Transition Temp, Tg (° C.)[2] | 1.8 | 2.4 | 2.5 | 0.7 |
| Melting Temp, Tm (° C.)[2] | 137 | 119/155 | 118/158 | 118/160 |
| Crystallization Temp, Tc (° C.)[2] | None | 71/101 | 71/103 | 70/105 |
| Can be easily processed into a sheet? | No | Yes | Yes | Yes |

[1]The same package of additional additives was used in each example.
[2]Tg, Tm, and Tc are measured using modulated DSC (ASTM D3418 method). Tg and Tm are obtained from second heating and Tc is obtained from the cooling curves.

Example B-1 is completely amorphous (no crystallization point) polycarbonate TPU with a high degree of phase mixing and longer solidification times resulting in significant processing issues such as tackiness when this material is extruded into sheet or tubing. Thus, Example B-1 would be very difficult to process into finished articles (via extruding, molding, etc.). Examples B-2, B-3, and B-4 are polycarbonate TPUs prepared according to the invention and are shown to have sharp Tc transitions. No tackiness issues are observed when Example B-2, B-3, and B-4 formulations are extruded into sheet. Thus, the inventive examples demonstrated good processing characteristics (including processing in continuous reactive extruders) as well as good properties for further processing into finished articles (via extruding, molding, etc).

Example Set C

A set of examples is prepared to demonstrate the crosslinking properties of the TPU compositions of the invention. The examples of this set are plasticizer free TPU compositions.

Examples C-1 and C-2 polyether TPU compositions each prepared on a lab scale batch process by combining all of their respective components in a reaction vessel which is then heated to 120° C. and reacted for about 3 minutes. The resulting material is then aged for 3 hours at 105° C. Each sample is then exposed to UV radiation and tested to determine the level of crosslinking that has occurred. This testing involves preparing a compression molded plaque with a 3-5 mil thickness from the TPU composition of each example. These plaques are then cured with UV light using an H UV lamp covering both UVC and UVB wavelengths with intensity of ~0.56 W/cm$^2$ and average irradiation density of 0.9 J/cm$^2$. The cured samples are then placed in hot THF for 30 minutes. Non-crosslinked samples will completely dissolve in less than 5 min. A sample that does not dissolve in the THF indicates formation of at least a partially crosslinked network. The formulations and test results for the examples are summarized in the table below, where are formulation values are weight percentages.

TABLE 4

|  | Example C-1 Inventive | Example C-2 Inventive |
|---|---|---|
| MDI | 25.1 | 24.9 |
| 1000 Mn PTMEG | 63.4 | 63.4 |
| UNILIN ™ 350 (C63) (crystalline) | 7.0 | 0.0 |
| UNILIN ™ 700 (C63) (crystalline) | 0.0 | 7.0 |
| BDO | 2.6 | 2.8 |
| IRGACURE ™ 651[1] | 2.0 | 2.0 |
| Did the sample dissolve in THF? | No | No |

[1]IRGARCURE ™ 651 is a photoinitiator available from Ciba.

Example Set D

A set of examples is prepared to demonstrate the improved compatibility the TPU compositions of the invention provide when blended with other polymers.

Examples D-1 and D-2 polyether TPU compositions each prepared in a research scale continuous extruder where each component is feed into the extrude as a separate stream, except that the additional additives are pre-mixed with the polyol component and charged to the extruder with the polyol. The formulations and test results for the examples are summarized in the table below, where all formulation values are weight percentages.

The formulations for the examples are summarized in the table below, where all formulation values are weight percentages.

TABLE 5

|  | Example D-1 | Example D-2 |
|---|---|---|
| MDI | 27.8 | 28.3 |
| 1000 Mn PTMEG | 65.3 | 65.3 |
| UNILIN ™ 700 (C63) (crystalline) | 3.0 | 3.0 |
| BDO | 4.0 | 4.0 |
| Stoichiometry (%) | 100.1 | 102.0 |
| Melt Flow Index (g/10 min)[1] | 381 | 120 |

[1]Melt flow index is measured at 190° C. using 8700 gram load.

The stoichiometry is controlled by chaining the MDI flow rate. The stoichiometry is changed to modify the final polymer MW.

Examples D-3, D-4, and D-5 are blends prepared from Examples D-1 and D-2. The blends are prepared using small a lab scale Brabender extruder with 3 mixing zones and a die. The following temperature profile was used in the Brabender: 190° C.-200° C.-210° C.-250° (Die).

The formulations for the examples are summarized in the table below, where are formulation values are weight percentages.

TABLE 6

|  | Example D-3 Comp | Example D-4 Inventive | Example D-5 Inventive |
|---|---|---|---|
| LDPE[1] | 50 | 40 | 40 |
| Polyether TPU[2] | 50 | 50 | 50 |
| D-1 | 0 | 10 | 0 |
| D-2 | 0 | 0 | 10 |
| Tensile Strength (MPa)[3] | 7 | 12 | 8 |
| Elongation (%)[3] | 31 | 484 | 203 |

[1]LDPE is a commercially available low density polyethylene polymer.
[2]The polyether TPU is a commercially available MDI-PTMEG-BDO TPU.
[3]Tensile strength and elongation are measured using ASTM D412 using compression molded plaques.

No stress transfer was observed for Example D-3 which gave very poor tensile strength and percent elongation values, suggesting no compatibility between the LDPE and TPU phases. When the TPU compositions of the invention are added in the small amount, acting as a blend compatiblizer, significant improvements in stress transfer is observed between the LDPE and TPU phases of the blends.

Each of the documents referred to above is incorporated herein by reference. Except in the Examples, or where otherwise explicitly indicated, all numerical quantities in this description specifying amounts of materials, reaction conditions, molecular weights, number of carbon atoms, and the like, are to be understood as modified by the word "about." Except where otherwise indicated, all numerical quantities in the description specifying amounts or ratios of materials are on a weight basis. Unless otherwise indicated, each chemical or composition referred to herein should be interpreted as being a commercial grade material which may contain the isomers, by-products, derivatives, and other such materials which are normally understood to be present in the commercial grade. However, the amount of each chemical component is presented exclusive of any solvent or diluent oil, which may be customarily present in the commercial material, unless otherwise indicated. It is to be understood that the upper and lower amount, range, and ratio limits set forth herein may be independently combined. Similarly, the ranges and amounts for each element of the invention can be used together with ranges or amounts for any of the other elements. As used herein, the expression "consisting essentially of" permits the inclusion of substances that do not materially affect the basic and novel characteristics of the composition under consideration. All of the embodiments of the invention described herein are contemplated from and may be read from both an open-ended and inclusive view (i.e., using "comprising of" language) and a closed and exclusive view (i.e., using "consisting of" language).

What is claimed is:

1. A thermoplastic polyurethane composition comprising the product of a reaction mixture comprising (i) a polyisocyanate component, (ii) at least one of a chain extender component or a polyol component, and (iii) a chain terminator component;
wherein the chain terminator component comprises a short chain crystalline compound containing 26 to 70 carbon atoms and a single NCO-reactive functional group capable of terminating a chain of a thermoplastic polyurethane resulting from the reaction of components (i) and (ii), wherein the short chain crystalline compound comprises one or more alpha-hydroxy terminated polyalphaolefins selected from a polyethylene, a polypropylene, a poly(ethylene-co-alphaolefin) copolymer, a poly(propylene-co-alphaolefin) copolymer, or any combination thereof; and
wherein the thermoplastic polyurethane composition comprises a crystalline end group formed by the chain terminator component.

2. The thermoplastic polyurethane composition of claim 1 wherein the thermoplastic polyurethane is represented by the following structure:

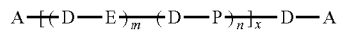

wherein each A is an end group derived from the short chain crystalline compound; each D is a group derived from the polyisocyanate component; each E is derived from the chain extender component; each P is derived from the polyol component; each m is an integer from 0 to 15; each n is an integer from 0 to 20; and x is an integer from 1 to 50; with the proviso that at least one of m and n is greater than 0.

3. The thermoplastic polyurethane composition of claim 1 wherein the reaction mixture comprises a chain extender component, comprising a diol, a diamine, or a combination thereof.

4. The thermoplastic polyurethane composition of claim 1 wherein the polyisocyanate component comprises MDI, H12MDI, HDI, TDI, IPDI, LDI, BDI, PDI, CHDI, TODI, NDI or a combination thereof.

5. The thermoplastic polyurethane composition of claim 1 wherein the reaction mixture comprises at least 75 percent by weight polyol component.

6. The thermoplastic polyurethane composition of claim 1 wherein the reaction mixture comprises a polyol component comprising a polyether polyol, a polyester polyol, a polycarbonate polyol, a polysiloxane polyol, or a combination thereof.

7. The thermoplastic polyurethane composition of claim 1 wherein the reaction mixture comprises a polyol component comprising a poly(ethylene glycol), poly(tetramethylene glycol), poly(trimethylene oxide), ethylene oxide capped poly(propylene glycol), poly(butylene adipate), poly(ethylene adipate), poly(hexamethylene adipate), poly(tetramethylene-co-hexamethylene adipate), poly(3-methyl- 1, 5-pentamethylene adipate), polycaprolactone diol, poly(hexamethylene carbonate) glycol, poly(pentamethylene carbonate) glycol, poly(trimethylene carbonate) glycol, polydimethyl siloxane polyol, or any combination thereof.

8. The thermoplastic polyurethane composition of claim 1 wherein the reaction mixture comprises a chain extender component comprising ethylene glycol, butanediol, hexamethylenediol, pentanediol, heptanediol, nonanediol, dodecanediol, ethylenediamine, butanediamine, hexamethylenediamine, or a combination thereof.

9. The thermoplastic polyurethane composition of claim 1 wherein the thermoplastic polyurethane composition has a Shore hardness below 65 A.

10. The thermoplastic polyurethane composition of claim 9 where the thermoplastic polyurethane composition is free of a plasticizer.

11. The thermoplastic polyurethane composition of claim 1 wherein the thermoplastic polyurethane composition has a surface tension lower than that of a thermoplastic polyurethane composition made without the chain terminator component.

12. The thermoplastic polyurethane composition of claim 1 wherein the composition further comprises a photoinitiator.

13. The thermoplastic polyurethane composition of claim 1 wherein the thermoplastic polyurethane composition is crosslinkable by E-Beam or gamma beam irradiation.

14. The thermoplastic polyurethane composition of claim 1 wherein the crystalline end group is grafted with a vinyl alkoxysilane moiety in the presence of a peroxide.

15. The thermoplastic polyurethane of claim 14 wherein the thermoplastic polyurethane composition is crosslinked by formation of siloxane crosslinks upon hydrolysis and subsequent condensation of the alkoxysilane groups;
resulting in a crosslinked network of thermoplastic polyurethane with crystalline end groups.

16. A blend comprising the thermoplastic polyurethane composition of claim 1, and a polyolefin.

17. An article comprising a film, a sheet, or a non-woven fabric, where said article is made from a composition comprising the blend of claim 16.

18. A method of making a thermoplastic polyurethane composition comprising the steps of: (I) reacting (i) a polyisocyanate component, (ii) at least one of a chain extender component or a polyol component, and (iii) a chain terminator component;
wherein the chain terminator component comprises a short chain crystalline compound containing 26 to 70 carbon atoms and a single functional group capable of terminating the chain of a thermoplastic polyurethane resulting from the reaction of components (i) and (ii), wherein the short chain crystalline compound comprises one or more alpha-hydroxy terminated polyalphaolefins selected from a polyethylene, a polypropylene, a poly(ethylene-co-alphaolefin) copolymer, a poly(propylene-co-alphaolefin) copolymer, or any combination thereof;
resulting in a thermoplastic polyurethane with crystalline end groups.

19. The method of claim 18 further comprising the step of reacting the resulting thermoplastic polyurethane with crystalline end groups with a crosslinkable vinyl alkoxysilane moiety in the presence of a peroxide;

resulting in a thermoplastic polyurethane with crystalline end groups where the crystalline end groups contain a crosslinkable vinyl alkoxysilane group.

* * * * *